United States Patent [19]

Henk et al.

[11] Patent Number: 4,868,148

[45] Date of Patent: Sep. 19, 1989

[54] LAYERED AUTOMOTIVE CATALYTIC COMPOSITE

[75] Inventors: Michael G. Henk; Jack C. Summers, II, both of Tulsa, Okla.

[73] Assignee: Allied-Signal Inc., Morris Township, Morris County, N.J.

[21] Appl. No.: 201,245

[22] Filed: Jun. 1, 1988

Related U.S. Application Data

[63] Continuation-in-part of Ser. No. 88,745, Aug. 24, 1987, abandoned.

[51] Int. Cl.$^4$ .................. B01J 23/10; B01J 23/56; B01J 23/76
[52] U.S. Cl. ........................... 502/303; 502/258; 502/259; 502/260; 502/261; 502/262; 502/302; 502/304; 502/326; 502/327; 423/213.5
[58] Field of Search ............... 502/303, 327, 258, 259, 502/260, 261, 262, 302, 304, 326; 423/213.5

[56] References Cited

U.S. PATENT DOCUMENTS

| | | | |
|---|---|---|---|
| 2,620,314 | 12/1952 | Hoekstra | 252/448 |
| 3,259,453 | 7/1966 | Stiles | 423/213.5 |
| 3,767,453 | 10/1973 | Hoekstra | 117/46 CA |
| 3,785,998 | 1/1974 | Hoekstra | 252/477 R |
| 3,873,469 | 3/1975 | Foster et al. | 252/455 |
| 3,920,583 | 11/1975 | Pugh | 252/465 |
| 3,931,050 | 1/1976 | Asano et al. | 502/327 X |
| 4,492,769 | 1/1985 | Blanchard et al. | 502/262 |
| 4,650,782 | 3/1987 | Onal | 502/325 X |
| 4,678,770 | 7/1987 | Wan et al. | 502/302 X |
| 4,702,897 | 10/1987 | Onal | 423/213.5 |
| 4,727,052 | 2/1988 | Wan et al. | 502/304 X |
| 4,760,044 | 7/1988 | Joy et al. | 502/303 |

FOREIGN PATENT DOCUMENTS 62-71537 4/1987 Japan.
62-71538 4/1987 Japan.

*Primary Examiner*—W. J. Shine
*Attorney, Agent, or Firm*—Frank S. Molinaro; Harold N. Wells; Roger H. Criss

[57] ABSTRACT

This invention relates to a catalytic composite for treating an exhaust gas comprising a first support which is refractory inorganic oxide having dispersed thereon at least one noble metal component and having dispersed immediately thereon an overlayer comprising at least one oxygen storage component and optionally a second support which is a refractory inorganic oxide. The first support may be selected from the group consisting of alumina, silica, titania, zirconia and aluminosilicates with alumina being preferred. Additionally, the noble metal component may be selected from the group consisting of platinum, palladium, rhodium, ruthenium and iridium. The oxygen storage component is an oxide of a metal which includes cerium, iron, nickel, cobalt lanthanum, neodymium, praesodymium, etc. and mixtures thereof. Cerium oxide is a preferred oxygen storage component. Finally, the second support may be selected from the group consisting of alumina, silica, titania, zirconia and aluminosilicates, with alumina preferred. This invention also relates to a process for minimizing the content of hydrogen sulfide in an automotive exhaust gas which comprises contacting said exhaust gas with a catalyst composite comprising a first support which is a refractory inorganic oxide having dispersed thereon at least one noble metal component and having dispersed immediately thereon an overlayer comprising at least one oxygen storage component and optionally a second support which is refractory inorganic oxide.

16 Claims, No Drawings

LAYERED AUTOMOTIVE CATALYTIC COMPOSITE

CROSS REFERENCE TO RELATED APPLICATIONS

This application is a continuation-in-part of prior copending application Ser. No. 088,745, filed Aug. 24, 1987, now abandoned.

BACKGROUND OF THE INVENTION

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. It is well known to use catalytic composites to simultaneously convert carbon monoxide, hydrocarbon and nitrogen oxide pollutants to innocuous gases. In order to achieve the simultaneous conversion of said pollutants, a catalytic composite (commonly called a three component control catalyst) is ordinarily used in conjunction with an air/fuel ratio control means which functions in response to a feedback signal from an oxygen sensor in the engine exhaust systems. The air-to-fuel ratio control means is typically programmed to provide fuel and air to the engine at a ratio at or near the stoichiometric balance of oxidants and reductants in the hot exhaust gases at engine cruising conditions, and to a stoichiometric excess of reductants during engine startup and at engine acceleration conditions. The result is that the composition of the exhaust gases with which the catalyst is contacted fluctuates almost constantly, such that conditions to which the catalyst is exposed are alternatively net-reducing (fuel rich) and net-oxidizing (fuel lean). A catalyst for the oxidation of carbon monoxide and hydrocarbons and the reduction of nitric oxide must be capable of operating in such a dynamic environment.

The exhaust gas also contains other components such as sulfur oxides, phosphorus and zinc compounds which are known catalyst poisons. The sulfur oxides present in the exhaust stream can react with the catalyst to form other products. For example under fuel lean (net-oxidizing) conditions, sulfur dioxide ($SO_2$) reacts with oxygen ($O_2$) over the catalyst to form sulfur trioxide ($SO_3$) which is then converted to sulfates ($SO_4^=$) by reaction with water. Under fuel rich (net-reducing) conditions the $SO_2$ reacts with hydrogen ($H_2$) to form hydrogen sulfide ($H_2S$). The formation of $H_2S$ is particularly objectionable because of its strong odor.

In addition to the formation of $H_2S$ over a noble metal catalyst, a storage phenomenon has also been observed. This storage phenomenon has been documented in the literature, G. J. Barnes and J. C. Summers, "Hydrogen Sulfide Formation Over Automotive Oxidation Catalysts," Society of Automotive Engineers, Paper No. 750093. The experimenters showed that sulfur accumulated on noble metal catalysts under both oxidizing and reducing atmospheres. For example, under oxidizing conditions the sulfur is typically stored as sulfates ($SO_4^=$) which is converted to $H_2S$ under reducing conditions.

Although this phenomenon has been recognized for many years, the problem which it generates, i.e. unpleasant odor, was relatively minor and was not of much concern until recently. In the past few years automotive catalyst technology has improved so that the catalysts are much more active than previous catalysts. Part of this improvement has been achieved by increasing the content of the oxygen storage component present in the catalytic composite. The most commonly used oxygen storage components are the rare earths. Unfortunately, the rare earths appear to increase the storage of sulfur during fuel lean operation, and when release occurs the concentration of hydrogen sulfide is much larger than would have been anticipated, based on the sulfur content of the fuel. Consequently, the resultant odor is quite noticeable and many more drivers are offended by the increased hydrogen sulfide odor.

Since the odor has become more noticeable and objectionable, a need exists to minimize the hydrogen sulfide emissions from catalyst equipped automobiles. The instant invention cures this problem by providing a catalytic composite in which the oxygen storage component is separated from the noble metal component. This is accomplished by depositing the noble metal component on a first support which is a refractory inorganic oxide and then depositing a layer consisting of an oxygen storage component and optionally a second support which is a refractory inorganic oxide immediately thereover.

The prior art, U.S. Pat. No. 3,873,469, does disclose a layered catalytic composite. Additionally, Japanese Public Disclosures 71537/87 and 71538/87 disclose a catalytic composite consisting of a ceramic carrier having dispersed thereon a catalytic layer containing one or more of Pd, Pt and Rh and an alumina layer containing one or more oxides of Ce, Ni, Mo and Fe. However, the stated advantage of the 71537 invention is that the oxides, which are oxygen storage components, renew the catalytic surface. This is accomplished by having the oxygen storage component in contact with the catalytic surface.

In contrast to this prior art, the present invention separates the catalytic layer from the oxygen storage component. This separation is in contravention to the prior art which states that intimate contact of the oxygen storage component with the catalytic metal is required in order for the oxygen storage component to be effective. Therefore, the instant invention differs from the prior art in that the oxygen storage component is separated from the catalytic or noble metal component. Additionally, the result of this difference is to minimize the formation of $H_2S$ over a catalytic composite, even though said catalytic composite contains the same or greater amount of an oxygen storage component as a conventional catalyst, a result quite distinct from that which could reasonably be expected from the teachings of the prior art.

SUMMARY OF THE INVENTION

This invention relates to a catalytic composite and a process for using said composite to treat an exhaust gas from an internal combustion engine. The catalytic composite comprises a first support which is a refractory inorganic oxide having dispersed thereon at least one noble metal component selected from the group consisting of platinum, palladium, rhodium, ruthenium and iridium and having dispersed immediately thereon an overlayer comprising at least one oxygen storage component and a second support which is a refractory inorganic oxide.

Accordingly, one specific embodiment of the invention comprises a catalytic composite for treating an exhaust from an internal combustion engine, said catalytic composite comprising alumina having dispersed thereon platinum and rhodium and having dispersed immediately thereon a layer consisting of cerium oxide and alumina.

It is another embodiment of this invention to provide a process for minimizing the content of hydrogen sulfide in an automotive exhaust gas which comprises contacting said exhaust gas with a catalytic composite comprising a first support which is a refractory inorganic oxide having dispersed thereon at least one noble metal component selected from the group consisting of platinum, palladium, rhodium, ruthenium and iridium and having dispersed immediately thereon an overlayer comprising at least one oxygen storage component and a second support which is a refractory inorganic oxide.

Other objects and embodiments will become more apparent after a more detailed description of the invention.

DETAILED DESCRIPTION OF THE INVENTION

As heretofore indicated, the present invention relates to a catalytic composite and a process for minimizing the content of hydrogen sulfide in an automotive exhaust using said catalytic composite. The catalytic composite comprises a first support which is a refractory inorganic oxide having dispersed thereon at least one noble metal component selected from the group consisting of platinum, palladium, rhodium, ruthenium and iridium and having dispersed immediately thereon an overlayer comprising at least one oxygen storage component and a second support which is a refractory inorganic oxide.

Accordingly, considering the first support utilized in the present invention, this first support includes but is not limited to alumina, silica, titania, zirconia, aluminosilicates, and mixtures thereof with alumina being preferred. When alumina is the desired first support, any alumina which is well known in the art, such as described in U.S. Pat. No. 4,492,769, may be used.

The first support of the instant invention can be used in any configuration, shape, or size which exposes the noble metal component dispersed thereon to the gas to be treated. The choice of configuration, shape and size of the support depends on the particular circumstances of use of the catalytic composite of this invention. One convenient shape which can be employed is particulate form. In particular, the first support can be formed into shapes such as pills, pellets, granules, rings, spheres, etc. The particulate form is especially desirable where large volumes of catalytic composites are needed, and for use in circumstances in which periodic replacement of the catalytic composite may be desired. In circumstances in which less mass is desirable or in which movement or agitation of particles of said first support may result in attrition, dusting and resulting loss of disposed metals or undue increase in pressure drop across the particles, a monolithic structure is preferred.

Thus, a specific example of the present invention is alumina spheres which may be continuously manufactured by the well known oil drop method which comprises: forming an alumina hydrosol by any of the techniques taught in the art and preferably by reacting aluminum metal with hydrochloric acid; combining the resulting hydrosol with a suitable gelling agent; and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 149°–205° C. and subjected to a calcination procedure at a temperature of about 455°–705° C. for a period of about 1 to about 20 hours. This treatment effects conversion of the alumina hydrogel to the corresponding crystalline gamma-alumina. See the teachings of U.S. Pat. No. 2,620,314 for additional details.

If it is desirable to employ a monolithic form, it is usually most convenient to employ the first support as a thin film or coating deposited on an inert carrier material, which provides the structural support for said first support. The inert carrier material can be any refractory material such as a ceramic or metallic material. It is preferred that the carrier material be unreactive with the first support and not be degraded by the gas to which it is exposed. Examples of suitable ceramic materials include sillimanite, petalite, cordierite, mullite, zircon, zircon mullite, spodumene, alumina-titanate, etc. Additionally, metallic materials may be used. Metallic materials which are within the scope of this invention include metals and alloys are disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. No. 3,785,998 and U.S. Pat. No. 3,767,453.

The first support may be deposited on said solid monolithic carrier by any conventional means known in the art. One convenient method is by dipping the solid carrier into a slurry of said first support. As an example when alumina is the desired first support, the preparation of a slurry from alumina is well known in the art and consists of adding the alumina to an aqueous solution of an acid such as nitric, hydrochloric, sulfuric, etc. The concentration of acid in said aqueous solution is not critical but is conveniently chosen to be about 1 to about 4 weight percent. Enough alumina should be added to said aqueous acid solution such that the specific gravity of the final slurry is in the range of about 1.1 to about 1.9. The resultant mixture is ball milled for about 2 to 24 hours to form a usable slurry which can be used to deposit a thin film or coating onto the monolithic carrier.

The actual coating procedure involves dipping the monolithic carrier into said first support slurry, blowing out the excess slurry, drying and calcining in air at a temperature of about 350° to about 800° C. for about 1 to about 2 hours. This procedure can be repeated until the desired amount of first support on said monolithic carrier is achieved. It is preferred that the first support, such as alumina, be present on the monolithic carrier in amounts in the range from about 28 g of support per liter of carrier volume to about 355 g of support per liter of carrier volume, where the volume is measured by the exterior dimensions of the monolithic carrier structure.

A second feature of the catalytic composite of this invention is that said first support has dispersed thereon at least one noble metal component selected from the group consisting of platinum, palladium, rhodium, ruthenium and iridium. The noble metal component may be dispersed on said first support by several methods well known in the art including coprecipitation, cogellation, ion exchange or impregnation. Of these methods one convenient method of dispersing said noble metal component on said first support is impregnation of said first support with an aqueous solution of a decomposable compound of said noble metal, drying and calcining in air to give a fine dispersion of said noble metal on said first support.

Illustrative of the decomposable compounds of said noble metals are chloroplatinic acid, ammonium chloroplatinate, hydroxy disulfite platinum (II) acid, bromoplatinic acid, platinum trichloride, platinum tetrachloride hydrate, platinum dichlorocarbonyl dichloride, dinitrodiamino platinum, sodium tetranitroplatinate, rhodium trichloride, hexaminerhodium chloride, rhodium carbonylchloride, rhodium trichloride hydrate, rhodium nitrate, sodium hexachlororhodate, sodium hexanitrorhodate, chloropalladic acid, palladium chloride, palladium nitrate, diaminepalladium hydroxide, tetraaminepalladium chloride, hexachloroiridate (IV) acid, hexachloroiridate (III) acid, dichlorodihydrooxoiridate (III) acid, ammonium hexachloroiridate (III), ammonium aquohexachloroiridate (IV), tetraaminedichloroiridate (III) chloride, and aquotetraammineiridate (III) chloride, ruthenium tetrachloride, hexachlororuthenate, and hexamineruthenium chloride. Of the compounds enumerated above, the following are preferred for dispersing the desired noble metal: chloroplatinic acid, rhodium chloride, chloropalladic acid, hexachloroiridate (IV) acid and hexachlororuthenate.

For three component control operation, it is desirable that the catalytic composite contain a combination of rhodium and platinum, palladium or mixtures thereof. Specific combinations include platinum and rhodium, palladium, platinum and rhodium, palladium and rhodium. However, under certain circumstances, e.g. when control of nitric oxide is not necessary, it is undesirable (from an economic consideration) for the catalytic composite to contain rhodium. In that case it is desirable for the catalytic composite to contain platinum, palladium and mixtures thereof.

When more than one noble metal is desired, the metals can be in a common aqueous solution or in separate aqueous solutions. When separate aqueous solutions are used, impregnation of said first support with said noble metal solutions can be performed sequentially in any order. Finally, hydrogen chloride, nitric acid or other suitable materials may be added to said solutions in order to further facilitate the uniform distribution of the noble metal components throughout said first support.

When said first support is to be deposited on a solid monolithic carrier, said first support may be impregnated with said aqueous noble metal solution either before or after the first support is deposited on said solid monolithic carrier. Of the two procedures, it is more convenient to impregnate the noble metal onto the first support after it has been deposited on said solid monolithic carrier.

It is desirable that the noble metal be present on said first support in a concentration ranging from about 0.01 to about 4 weight percent of said first support. Specifically, in the case of platinum and palladium the range is from about 0.1 to about 4 weight percent. In the case of rhodium, ruthenium and iridium, the range is about 0.01 to about 2 weight percent. If both platinum and rhodium are present, the ratio of the platinum to rhodium content is from about 2:1 to about 20:1 platinum:-rhodium. The same is true if palladium and rhodium are present.

A third feature of the catalytic composite of this invention is an overlayer comprising at least one oxygen storage component and optionally a second support which is a refractory inorganic oxide. This overlayer is dispersed immediately thereover said first support containing at least one noble metal component. The oxygen storage component is an oxide of a metal selected from the group consisting of iron, nickel, cobalt and the rare earths, with the rare earths being preferred. Illustrative of the rare earths contemplated as within the scope of the invention are cerium, lanthanum, neodymium, europium, holmium, ytterbium, praesodymium, dysprosium, and mixtures thereof. Specific preferred rare earths are cerium, lanthanum, and mixtures of cerium and lanthanum. Additionally, if a second support is present in said overlayer, said second support may be selected from the group consisting of alumina, silica, titania, zirconia, aluminosilcates, and mixtures thereof, with alumina being preferred.

The overlayer which comprises said oxygen storage component may be applied to said first support by means known in the art such as using a colloidal dispersion of the oxygen storage component, impregnating with metal compounds of the oxygen storage components that do not penetrate into the micropores of said first support, etc. Further, when said overlayer comprises an oxygen storage component and a second support, said oxygen storage component may be dispersed onto said second support or a solid form of said oxygen storage component may be mixed with said second support. Although it is not essential that the overlayer contain a second support, it is preferred that a second support be present for monolithic applications.

Thus, one example of a method to disperse an oxygen storage component onto said second support is to impregnate the refractory inorganic oxide with an aqueous solution of a decomposable compound of said oxygen storage component, drying and calcining in air the resultant mixture to give a second support which contains an oxide of said oxygen storage component. Examples of water soluble decomposable oxygen storage components which can be used include but are not limited to cerium acetate, lanthanum acetate, neodymium acetate, europium acetate, holmium acetate, yttrium acetate, praesodymium acetate, dysprosium acetate, iron acetate, cobalt acetate, nickel acetate, cerium nitrate, lanthanum nitrate, neodymium nitrate, europium nitrate, holmium nitrate, yttrium nitrate, praesodymium nitrate, dysprosium nitrate, iron nitrate, cobalt nitrate, nickel nitrate, cerium chloride, lanthanum chloride, neodymium chloride, europium chloride, holmium chloride, yttrium chloride, praesodymium chloride, dysprosium chloride, iron chloride, cobalt chloride, nickel chloride.

Accordingly, in one specific example an appropriate amount of alumina is added to an aqueous solution of cerium acetate. This mixture is then dried and calcined in air at a temperature of about 400° to about 700° C. for a time of about one to three hours. This results in the formation of cerium oxide which is well dispersed throughout the alumina.

Alternatively, a solid form of said oxygen storage component is mixed with the appropriate amount of said second support. After mixing, a homogeneous mixture of the two solids is obtained. The criteria required of the solid form of said oxygen storage component are that (1) it be insoluble in water and in the acid/water solution used to prepare a slurry as described above, and (2) if the solid is not the metal oxide that said solid decompose to the oxide upon calcination in air. Examples of these insoluble solids include cerium sulfate, lanthanum sulfate, neodymium sulfate, europium sulfate, holmium sulfate, yttrium sulfate, iron sulfate, cobalt sulfate, nickel sulfate, cerium oxalate, lanthanum oxalate, neodymium oxalate, europrium oxalate, holmium oxalate, yttrium oxalate, iron oxalate, nickel oxalate, cobalt oxalate, cerium oxide, lanthanum oxide, neodymium oxide, europium oxide, holmium oxide, yttrium oxide, iron oxide, nickel oxide, cobalt oxide with the oxides being preferred. Thus a specific example consists of adding cerium oxide to an alumina powder.

When the catalytic composite is to be used in the form of a solid monolithic carrier, one method of applying said overlayer is to prepare a slurry of said oxygen storage component and optionally a second support and apply said slurry immediately over the first support containing at least one noble metal which has been deposited on said monolithic support; said overlayer may be applied in the same manner as described above for the first support.

It is desirable to apply an overlayer such that the concentration of said oxygen storage component is about 2 to about 75 weight percent of said first support and preferably from about 20 to about 70 weight percent. Additionally, when the overlayer also contains a second support, said second support is present in a concentration of 0 to 80 weight percent of said overlayer. More preferably, the concentration of said second support is about 30 to about 70 weight percent of said overlayer.

When particulate form is desired, said oxygen storage component may be separated from the noble metals by controlling the penetration depth of the noble metals into the interior of the particulates. For example, the noble metals can be made to penetrate into the interior of the spheres or other particulate form by means well known in the art such as the adding of chloride ions or a carboxylic acid to the impregnating solution. Subsequently, the oxygen storage component may be placed on or near the surface of the spheres or particulates by means as described above, i.e., using a colloidal dispersion of said oxygen storage component or using oxygen storage compounds which do not penetrate into the micropores of the spheres.

Accordingly, one specific example consists of alumina spheres which have been impregnated with platinum and rhodium. These spheres are then impregnated with a solution of cerium nitrate. The spheres are then dried and calcined in air.

Thus, the resultant catalytic composite is characterized by the noble metal component being separated from the rare earth component. As mentioned above this configuration of the noble metal and oxygen storage component is contrary to the prior art which teaches that an intimate mixture of the noble metal and oxygen storage component is necessary in order for the catalytic composite to effectively treat an automotive exhaust gas. It has been determined, however, that when the oxygen storage component is separated from the noble metals, a larger amount of oxygen storage component is necessary to obtain an equivalent catalytic composite to one in which the oxygen storage component is intimately mixed with the noble metal component. But the requirement of additional oxygen storage component over a conventional catalytic composite is offset by the ability of the instant catalytic composite to minimize the amount of $H_2S$ produced. Therefore, the catalytic composite of the present invention shows unexpected results over the prior art.

Another embodiment of the instant invention is a process for minimizing the $H_2S$ formation over a catalytic composite used for treating an automotive exhaust. The process comprises contacting said automotive exhaust with the catalytic composite described heretofore. A mechanism of how $H_2S$ is formed over a catalytic composite and how the instant process minimizes the $H_2S$ formation follows. It is to be understood that this mechanism is presented by way of illustration and is not intended to limit the broad scope of the invention.

Gasoline fuel typically contains about 0.005 to about 0.7 weight percent sulfur, usually as organic sulfur compounds. During the combustion process these sulfur compounds are converted to gaseous sulfur compounds such as $SO_2$ and $SO_3$. In order to completely combust the gasoline fuel, at least a stoichiometric weight amount of air is required. For example if the gasoline is indolene, the stoichiometric weight ratio is 14.56:1. of air:fuel. Using this ratio, therefore, one obtains that the gaseous sulfur compound concentration in the exhaust gas may range from about 3 to about 480 ppm.

During the time that the exhaust gas is stoichiometric or net oxidizing, certain components of the catalyst are capable of reacting with the gaseous sulfur compounds in the exhaust gas ($SO_2$ and $SO_3$) and with $O_2$ in the exhaust gas to form stable sulfates. For example, alumina would be expected to form sulfates of aluminum such as $Al_2(SO_4)_3$ at temperatures below about 400° C. and at a gaseous sulfur oxides ($SO_x$) concentration of 20 ppm; cerium oxide will similarly form sulfates of cerium such as $Ce_2(SO_4)_3$ at the same gaseous $SO_x$ level at temperatures below about 500° C., while lanthanum oxide will form sulfates of lanthanum at the same $SO_x$ level but at temperatures below about 700° C.

The resultant sulfates formed on the catalytic composite at the conditions described above are unstable under fuel rich conditions. Therefore, when the air/fuel ratio becomes fuel rich, the solid sulfates will begin to decompose with the subsequent formation of hydrogen sulfide ($H_2S$), which will be emitted from the exhaust at concentrations that may be noxious. The reason that the concentrations of $H_2S$ may be excessively high is that large amounts of sulfates can be stored on a catalytic composite under periods of stoichiometric or fuel lean operations and then released during periods of fuel rich operation.

Since the exhaust temperature is normally above 400° C., the majority of the $H_2S$ which is released comes from the formation of rare earth sulfates. Thus, it has been found that using a catalytic composite that does not contain any rare earth oxides minimizes the formation and release of $H_2S$. However, the ability of a catalytic composite that does not contain a rare earth oxide to treat an automotive exhaust is inferior to a catalytic composite that does contain a rare earth oxide.

However, the present invention solves this problem by separating the rare earth oxide from the noble metals. It appears that by separating the oxygen storage component from the noble metals, the corresponding metal sulfates are not formed as easily, thereby reducing the amount of $H_2S$ which is formed. Additionally, any $SO_2$ or $SO_3$ species which may be stored on the oxygen storage components are not as easily converted to $H_2S$. The reason for this is that the conversion of $SO_2$ or $SO_3$ to $H_2S$ under fuel rich conditions requires a catalyst. Since the $SO_2$ or $SO_3$ is released from an overlayer above the noble metals, as the $SO_2$ or $SO_3$ are released, they will be swept away by the exhaust gas and not have a chance to diffuse where the noble metals are located and form $H_2S$. The end result is that $H_2S$ formation is minimized.

In order to more fully illustrate the advantages to be derived from the instant invention, the following examples are set forth. It is to be understood that the examples are only by way of illustration and are not intended as an undue limitation on the broad scope of the invention as set forth in the appended claims.

EXAMPLE I

This example describes a test developed to measure hydrogen sulfide emissions. The test consisted of two parts: storage of sulfur compounds and hydrogen sulfide release. The conditions for these two parts of the test are presented in Table 1 below.

TABLE 1

| Test Condition | Storage | Release |
|---|---|---|
| Inlet Temperature (°C.) | 515 | 492 |
| Air/Fuel Ratio (Stoichiometry = 14.56) | 14.80 | 13.10 |
| GHSV(hr$^{-1}$) | 63,000 | 63,000 |
| Duration (min) | 60 | 15 |
| Fuel Sulfur Level (ppm) | 120 | 120 |

The catalytic composite was first exposed to the storage condition to store sulfate. Then the air/fuel ratio was changed to the release condition. Exhaust samples were collected in scrubbers and analyzed for $H_2S$ using a colorimetric method established by the Environmental Protection Agency (EPA). Details on the $H_2S$ analysis method are available in EPA interim report EPA-600/2-80-068 which is available from the EPA. Samples were taken during the following time intervals: 0–1, 1–2, 2–3, 3–4, 9–10, and 14–15 minutes after switching to the release condition.

Controlling the release of $H_2S$ during the first two minutes of fuel rich operation is most important because fuel rich modes of operation typically do not last substantially longer than two minutes. Additionally, the $H_2S$ emissions are most objectionable when released as large spikes. These two criteria should be used to evaluate the catalytic composites herein described.

EXAMPLE II

The conventional catalytic composite was prepared by the following method. In a beaker, 5000 grams of pseudo-boehmite alumina and 13,562 grams of a solution of cerium acetate was mixed, which solution contained 7 weight percent cerium. The resultant mixture was stirred for 30 minutes, transferred to a shallow tray, dried for 4 hours at 150° C. and finally calcined at 600° C. for 1 hour. The calcined alumina/cerium oxie powder was next stirred into a container which contained 5.33 liters of water and 48 mL of concentrated nitric acid ($HNO_3$). This mixture was ball milled for 4 hours.

An oval shpaed cordierite monolith with a minor axis of 3.18 inches (8.08 cm), a major axis of 6.68 inches (16.97 cm), a length of 4.5 inches (11.43 cm) and having 400 square channels per square inch of facial area was dipped into the above described slurry. After dipping, the excess slurry was blown out with an air gun. The slurry coated monolith was calcined for about 1 hour at 540° C. The above described dipping, blow-out and calcining steps were repeated until the monolith contained 128 g of coating per liter of monolith volume.

Next the platinum and rhodium metals were impregnated onto the above-described washcoated monolith. The above-described monolith was dipped into an aqueous solution containing 10 mg of chloroplatinic acid (29.5 weight % Pt) per gram of solution and 10 mg of rhodium chloride (9.8 weight % rhodium) per gram of solution and 5 weight percent sugar. After dipping, the impregnated monolith was dried and calcined for about one hour at 540° C. This catalytic composite was designated Catalyst A. The calculated composition of Catalyst A in units of g/liter was: Pt=1.5; Rh=0.3; Ce=23.3.

EXAMPLE III

A catalytic composite of the present invention was prepared as follows. To a container which contained 5.3 liters of water and 48.0 mL of concentrated nitric acid ($HNO_3$), there were added 5,000 grams of delta alumina. This mixture was ball milled for 24 hours.

An oval shaped cordierite monolithic carrier with a minor axis of 3.18 inches (8.08 cm), a major axis of 6.68 inches (16.97 cm), a length of 4.5 inches (11.43 cm) and having 400 square channels per square inch of facial area was dipped into the above described slurry. After dipping, the excess slurry was blown out with an air gun. The slurry coated monolith was calcined for about 1 hour at 540° C. The above described dipped, blow-out and calcining steps were repeated until the monolith contained 128 g of coating per liter of monolith volume.

Next the platinum and rhodium metals were impregnated onto the above-described washcoated monolith. The above-described monolith was dipped into an aqueous solution containing 10 mg of chloroplatinic acid (29.5 weight % Pt) per gram of solution, 10 mg of rhodium chloride (9.8 weight percent rhodium) per gram of solution, and 5 weight percent sugar. After dipping, the impregnated monolith was calcined for about one hour at 540° C.

Finally, 26,800 grams of cerium acetate solution (7 weight percent cerium) and 5,000 grams of pseudo-boehmite alumina were mixed in a container and processed as in Example II. The resultant powder was used to prepare a slurry as in Example II. This slurry was applied to the monolithic carrier as described above such that the carrier contained 85 g of a ceria/alumina overlayer per liter of monolith. This catalytic composite was designated Catalyst B. The calculated composition of catalyst B in units of g/liter was: Pt=1.5; Rh=0.3; Ce=35.3.

EXAMPLE IV

Catalysts A and B were tested according to the procedure set forth in Example I and the results are presented in Table 2.

TABLE 2

| Catalyst I.D. | H$_2$S Concentration During Release Intervals (mins.) (mgH$_2$S/m$^3$ of gas scrubbed) | | | |
|---|---|---|---|---|
| | 0–1 | 1–2 | 2–3 | 14–15 |
| Catalyst A (conventional) | 205 | 80 | 52 | 2 |
| Catalyst B | 32 | 21 | 15 | 9 |

The data clearly indicate that the catalyst of the instant invention (Catalyst B) minimizes the amount of H$_2$S which is released. Additionally, the data show that the amount of H$_2$S which Catalyst B released during the first two minutes of the test is more than five times less than the conventional catalyst. Controlling the release of H$_2$S during the first two minutes of fuel rich operation is most important because fuel rich modes of operation typically do not last substantially longer than two minutes. Additionally, the H$_2$S emissions are most objectionable when released as large spikes such as exhibited by the conventional catalyst (Catalyst A).

EXAMPLE V

The following tests were conducted in order to show that the catalyst of the instant invention has at least equivalent ability to treat an exhaust gas from an internal combustion engine. Fresh samples of Catalyst A and Catalyst B were prepared as per Examples II and III respectively. Each catalyst was mounted in a converter and each converter was placed in the exhaust stream from one bank of a V-8 gasoline fueled engine. The engine was operated according to the following cycle.

The engine used for this durability cycle was a Ford 5.0 L V-8 engine equipped with duel throttle body fuel injector. The durability cycle consisted of a 60 second cruise mode and a 5 second fuel cut mode. During the cruise mode, the engine operated a stoichiometry while during the fuel cut mode, the engine operated at a fuel lean condition that included a temperature and an oxygen spike. The fuel cut mode is achieved by breaking the circuit between one of the fuel injectors and the Electronic Engine Control. The engine speed and load on the engine was adjusted to give an exhaust gas temperature of 850° C. during the cruise mode and 800° C. during the fuel cut mode. This cycle was repeated for 25 hours.

After Catalysts A and B were exposed to the durability cycle as described above, they were evaluated using an engine dynamometer performance test. The test involved evaluating the catalyst at seven different air/fuel (A/F) ratio points (14.71, 14.66, 14.61, 14.56, 14.51, 14.46 and 14.41) at an inlet temperature of 450° C. At each A/F point, the air/fuel was oscillated plus or minus 0.1 A/F at one Hertz frequency. Conversions of hydrocarbon, carbon monoxide and nitric oxides were calculated at each A/F and then an integral performance conversion was obtained by averaging all the conversions.

Additionally, Catalysts A and B were evaluated using a test which consisted of a continuous temperature traverse at an A/F ratio of approximately 14.55. During this test the temperature of the exhaust gas going into the converter was continuously varied from 200° C. to 460° C. by varying the heat transfer rate of a stainless steel heat exchanger. Conversion of hydrocarbon, carbon monoxide and nitric oxides were calculated as a function of temperature. The time required to reach 50% conversion is a common criterion used to evaluated catalytic composites (referred to as light off performance) and is reported here. The results of these evaluations are present in Table 3.

TABLE 3

| Catalyst I.D. | Temperature (°C.) Required to Reach 50% Conversion | | | Integral Performance % Conversion | | |
|---|---|---|---|---|---|---|
| | HC | CO | NO$_x$ | HC | CO | NO$_x$ |
| Catalyst A (Conventional) | 355 | 365 | 326 | 89 | 60 | 68 |
| Catalyst B | 355 | 364 | 316 | 88 | 61 | 68 |

The data indicate that Catalysts A and B are at least equivalent after a severe durability test.

EXAMPLE VI

Fresh samples of Catalyst A and B prepared as described in Examples II and III respectively were placed in a converter and tested according to the temperature traverse test of Example V. These results are presented in Table 4.

TABLE 4

| Catalyst I.D. | Temperature (°C.) Required to Reach 50% Conversion | | |
|---|---|---|---|
| | HC | CO | NO$_x$ |
| Catalyst A (Conventional) | 339 | 315 | 309 |
| Catalyst B | 322 | 301 | 279 |

These data show that the Catalyst of the instant invention (Catalyst B) has a lower light-off temperature than the conventional catalyst. This means that in actual use, i.e. when a vehicle is first started up, Catalyst B will be operational before Catalyst A. Thus, Catalyst B has improved activity over the catalyst of the prior art.

What is claimed is:

1. A catalytic composite for treating an exhaust gas and minimizing the hydrogen sulfide content thereof, said catalytic composite comprising a first support which is a refractory inorganic oxide selected from the group consisting of alumina, silica, titania, zirconia, aluminosilicates and mixtures thereof, having dispersed thereon at least one noble metal component selected from the group consisting of platinum, palladium, rhodium, ruthenium, and iridium substantially in the absence of an oxygen storage component and having dispersed immediately thereon an overlayer separated from said noble metal component comprising at least one oxygen storage component which is an oxide of a metal selected from the group consisting of iron, nickel, cobalt and the rare earths and optionally a second support which is a refractory inorganic oxide.

2. The catalytic composite of claim 1 where said first support is in the shape of pellets.

3. The catalytic composite of claim 1 where said first support is deposited on a solid ceramic or metallic honeycomb monolithic carrier.

4. The catalytic composite of claim 1 where said first support is alumina.

5. The catalytic composite of claim 1 where the noble metal component is platinum, palladium or a mixture thereof, each metal present in a concentration in the range of about 0.01 to 4 weight percent of said first support and optionally rhodium in a concentration of 0.01 to 2 weight percennt of said first support.

6. The catalytic composite of claim 5 where the metals are a mixture of platinum and rhodium.

7. The catalytic composite of claim 5 where the metals are a mixture of palladium and rhodium.

8. The catalytic composite of claim 5 where the metals are a mixture of platinum, palladium and rhodium.

9. The catalytic composite of claim 1 where said oxygen storage component in said overlayer is present in a concentration of about 2 to about 75 weight percent of said first support.

10. The catalytic composite of claim 1 where said second support is present in a concentration of 0 to 80 weight percent of sid overlayer.

11. The catalytic composite of claim 1 where said oxygen storage component is a rare earth oxide.

12. The catalytic composite of claim 11 where said oxygen storage component is lanthanum oxide.

13. The catalytic composite of claim 11 where said oxygen storage component is cerium oxide.

14. The catalytic composite of claim 11 where said oxygen storage component consists of a mixture of lanthanum and cerium oxides.

15. The catalytic composite of claim 1 where said second support is selected from the group consisting of alumina, silica, titania, zirconia and aluminosilicates.

16. The catalytic composite of claim 15 where said second support is alumina.

* * * * *